United States Patent [19]

Pratt et al.

[11] 3,883,612

[45] May 13, 1975

[54] LOW-SHRINK THERMOSETTING POLYMERS

[75] Inventors: Ivor Pratt, Tunbridge Wells, England; Ulrich Boschert, Tallmadge, Ohio

[73] Assignee: SCM Corporation, Cleveland, Ohio

[22] Filed: Feb. 8, 1973

[21] Appl. No.: 330,474

[52] U.S. Cl. ................................ 260/862; 260/871
[51] Int. Cl. ........................................... C08f 21/00
[58] Field of Search ............................ 260/862, 871

[56] References Cited
UNITED STATES PATENTS

| | | | |
|---|---|---|---|
| 3,166,434 | 1/1965 | Gauger et al. | 117/57 |
| 3,333,022 | 7/1967 | Reiners et al. | 260/869 |
| 3,340,327 | 9/1967 | Spellberg et al. | 260/861 |
| 3,347,806 | 10/1967 | Zimmermann | 260/22 |
| 3,448,066 | 6/1969 | Parker | 260/22 |

FOREIGN PATENTS OR APPLICATIONS

| | | | |
|---|---|---|---|
| 740,581 | 4/1970 | Belgium | 260/862 |

OTHER PUBLICATIONS

"Organic Reactions," Vol. 4, p. 54, Adams, Wiley & Sons, 1948.

*Primary Examiner*—Morris Liebman
*Assistant Examiner*—E. A. Nielsen
*Attorney, Agent, or Firm*—Thomas M. Schmitz

[57] ABSTRACT

The invention pertains to a one-part low-shrink or low-profile molding composition based on a dicyclopentadiene-modified polyester resin. The molding resin compositions are stabilized emulsions comprising a thermosetting unsaturated polyester polymer modified with dicyclopentadiene, an ethylenically unsaturated monomer copolymerizable with the thermosetting polyester polymer, and a thermoplastic resin having acid groups whereby the molding resin compositions are suitable for thickening with alkaline earth oxide and/or hydroxide thickeners.

7 Claims, 6 Drawing Figures

LOW-SHRINK THERMOSETTING POLYMERS

BACKGROUND OF THE INVENTION

Unsaturated polyester polymers blended with vinyl monomers such as styrene are well-known molding resins that may be cured at room temperature or under heat and/or pressure to form thermoset plastic molded parts. Very often these molding resins include inert fillers, glass fibers, glass flakes, talcs, and the like for the purpose of obtaining improved impact strength, flexural strength, and rigidity in the molded parts.

A rapidly expanding interest in molding compositions has been generated by the automotive market wherein molding compositions are being utilized for preparing automobile bodies and accessories such as, for example, grill and headlamp housings, fender extensions, and hood scoops. Most conventional thermosetting polyester resins, however, characteristically shrink about 8 to 10% by volume and distort during the press molding process whereby such molding resins are unsatisfactory despite the many favorable characteristics inherent in polyester molding compositions.

Low-shrink molding compositions have been suggested which consist of a conventional unsaturated polyester resin mixed with certain thermoplastic resins having carboxylic acid functionality. The polyester resin is a conventional copolymer of glycols esterified primarily with major amounts of unsaturated dibasic acids or anhydrides and lesser amounts of saturated dibasic acid or anhydrides and dissolved in styrene monomer. The suggested polyester resin thermoplastic resin mixture, however, is an unstable resin mixture which physically separates into two distinct liquid phases upon standing in a container. Prior to use, the two resin phases are mechanically agitated whereby one liquid resin phase is temporarily mixed with the other liquid resin phase to produce a cloudy and unstable resin mixture. Such unstable resin mixtures are said to be advantageous to produce a cured, low-shrink molded product wherein the thermoplastic polymer physically disassociates from the polyester phase during the molding process. The unsaturated polyester polymer cross-links with the styrene monomer producing an optically heterogeneous multiphase cured structure wherein the thermoplastic resin is grossly incompatible with the cross-linked polyester phase. Hence, two distinct phases are readily apparent in the finished molded product. Disadvantages of an unstable molding resin system are many. Mechanical agitation of the unstable two-phase system is required prior to use to insure consistent resin balance. Other disadvantages of the unstable two-phase systems include inconsistent lot-to-lot reproducibility of the molding resin thus causing the molding operator to adjust the molding conditions for each lot of resin received. Further, the surface of the molded product comprises a multiphase structure having a distinct thermoplastic phase which is sensitive to solvents thereby causing problems with subsequent surface painting operations.

These and other disadvantages in prior art low-shrink or low-profile molding compositions are overcome by the molding resin compositions of this invention. Accordingly, it is a primary object of this invention to provide a uniform stabilized molding resin composition suitable for use in producing low-shrink molded articles.

SUMMARY OF THE INVENTION

In accordance with this invention, a molding resin composition is provided comprising a dicyclopentadiene-modified polyester resin intermixed with a thermoplastic polymer having acid functionality. The resin composition is a uniform stabilized resin emulsion mixture. The polyester resin is a dicyclopentadiene-terminated polyester polymer mixed with ethylenically unsaturated monomer wherein the polyester polymer comprises dicyclopentadiene and glycol primarily esterified with unsaturated dibasic acids. The preferred process for synthesizing the dicyclopentadiene-terminated polyester polymer includes first producing a prepolymer by esterfying dicyclopentadiene with the unsaturated dibasic acid at temperatures less than 320°F., whereby dicyclopentadiene will be preferentially tied to the polyester backbone by ester linkages. The DCP polyester polymer and the thermoplastic polymer are mixed with monomer to form a stable and uniform molding resin system suitable for thickening with certain alkaline earth oxides and hydroxides and curable to a uniform solid structure.

The objectives and advantages of this invention will be better understood by referring first to the drawings, in which.

DETAILED DESCRIPTION OF THE INVENTION

Figure 1:
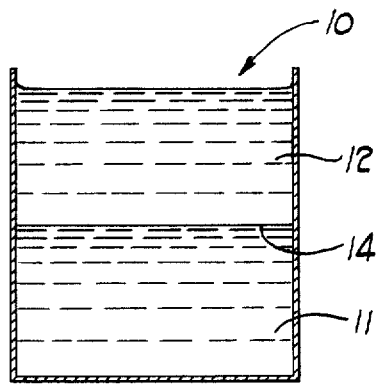
FIG. 1 shows a prior art resin system comprising an unstable mixture of two resins separated by a meniscus.

Referring now to the drawings, wherein like characters indicate like elements, FIG. 1 indicates a prior art resin system generally indicated as 10. The prior art resin system 10 is an unstable liquid resin system which forms a lower phase liquid polyester resin 11 and an upper phase liquid thermoplastic polymer resin 12 separated by a menicus 14. Upon vigorous agitation, phases 11 and 12 merge into a cloudy and unstable resin mixture (not shown).

Figure 2:
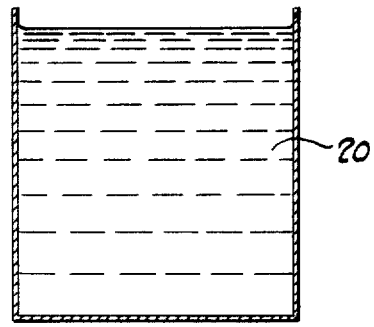
FIG. 2 shows the stabilized resin system of this invention comprising a homogeneous stabilized emulsion.

FIG. 2 shows the stable emulsified molding resin system 20 of this invention indicated as being visually clear although microscopically an emulsion. The emulsion 20 is a stable emulsion providing a liquid/liquid dispersion wherein one liquid polymer phase is dispersed within the other liquid polymer phase to provide a uniform emulsion system.

Figure 3:
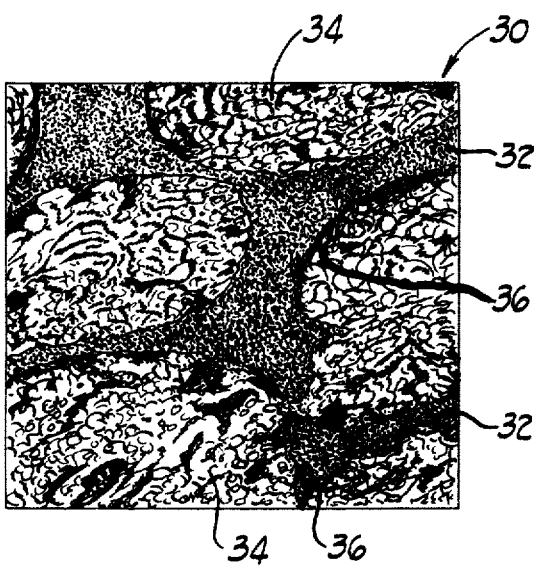
FIG. 3 is a magnified surface view of a cured (cross-linked) molded product produced by curing the prior art resin shown in FIG. 1 after mixing the same.
Figure 5:
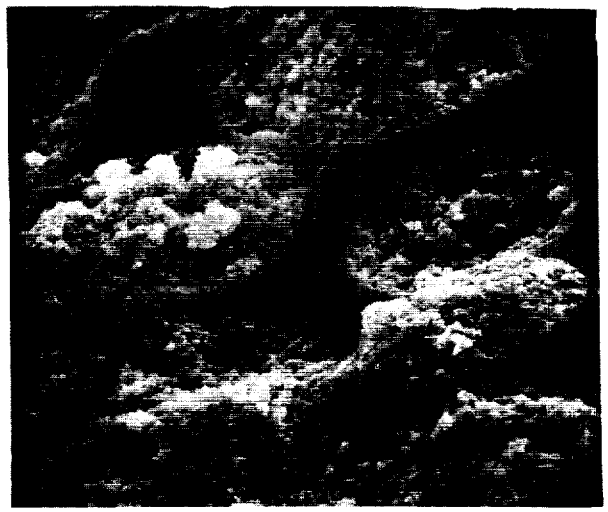
FIG. 5 is a scanning electron micrograph magnified 1,000 times and taken of the surface of a cured resin structure produced by curing the prior art resin system shown in FIG. 1.

FIG. 3 is a magnified view of a cured or cross-linked prior art resin wherein the cured structure 30 characteristically includes a distinct two-phase structure. The cured structure 30 comprises a cross-linked polyester portion 32 which is physically separated from the adjacent thermoplastic resin phase 34 having a boundary 36 defining the two phases 32 and 34. The cured multiphase structure 30 indicates grossly incompatible phases 32 and 34, adjacently disposed, when examined microscopically. In this regard, FIG. 5 is a scanning electron micrograph magnified 1,000 times of a prior art resin cured after mixing and producing a distinct two-phase heterogeneous structure, as depicted in FIG. 3, wherein the photograph indicates the two phases are grossly incompatible and the thermoplastic phase 34 is physically exuded from the cross-linked polyester phase 32. Hence, the gross incompatibility of the cured structure 30 takes the form of a distinct two-phase structure consisting typically of offwhite spheres (thermoplastic 34) dispersed in a clear matrix (polyester 32).

Figure 4:
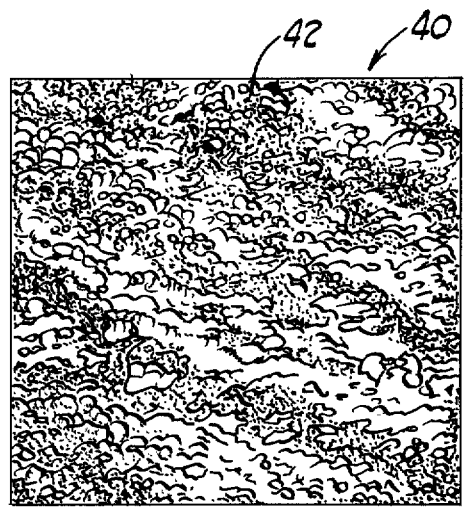
FIG. 4 is a magnified surface view of a molded product produced by curing the resin composition of this invention.
Figure 6:
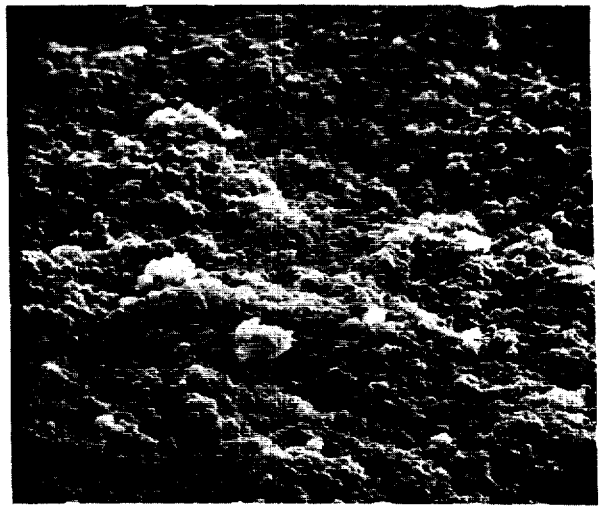
FIG. 6 is a scanning electron micrograph magnified 1,000 times and taken of the surface of a cured resin structure produced by curing the resin mixture of this invention.

FIG. 4 is a magnified view of the cured or cross-linked molding resin composition of this invention. The cured structure 40 comprises a substantially uniform mass 42 comprising the polyester polymer cross-linked with styrene monomer and having the thermoplastic resin phase uniformly distributed therein when viewed microscopically. In like manner, FIG. 6 is a scanning electron micrograph, magnified 1,000 times, of the cured resin structure of the molding resin system of this invention.

Referring now to the low-shrink (low-profile) resin composition of this invention, the same is primarily based upon a dicyclopentadiene terminated unsaturated polyester polymer (DCP-polyester) mixed with ethylenically unsaturated monomer to produce a DCP-polyester resin. The DCP-polyester resin is blended with thermoplastic polymer having acid groups, thickeners and other additives, as hereinlater described in detail.

The DCP-terminated polyester polymer preferably comprises a copolymer of glycol, unsaturated dibasic acid, and about 0.1-0.4 mols of dicyclopentadiene per mol of unsaturated dibasic acid. Although all of the raw materials may be charged into the reaction vessel and reacted together at temperatures of 290°-310°F., it is preferred that the dicyclopentadiene be preferentially esterified with the unsaturated dibasic acid to minimize etherification with hydroxyl groups. At temperatures of about 308°F., etherification of dicyclopentadiene with hydroxyl groups is a competing reaction to esterification of dicyclopentadiene with carboxyl groups. Hence, preferably only a portion of the glycol charge is reacted with a large molar excess of dibasic unsaturated acid to first form primarily an acid terminated glycol-dibasic acid partial polymer. Thereafter, dicyclopentadiene is charged to the reactor to form a dicyclopentadiene-esterified polyester prepolymer.

The preferred DCP-terminated polyester prepolymer is prepared by first charging into the reactor 2 molar equivalents of dibasic unsaturated acid per molar equivalent of glycol. The glycol and dibasic acid mixture is then heated and reacted at temperatures of about 290°-310°F. until substantially all of the glycol is esterified by the excess molar equivalent of unsaturated dibasic acids. Completion of the glycol esterification may be measured by the acid number of the reactants becoming essentially constant, thus indicating no additional hydroxyl groups are available for esterification. Thereafter, dicyclopentadiene is added to the reactor and reacted with the glycol-dibasic acid partial polymer at temperatures of less than 320°F., and preferably reaction temperatures of about 290°-310°F. After the dicyclopentadiene is completely charged to the reactor, the reactant mixture is maintained at about 308°F. until the acid number of the reactants becomes essentially constant whereby the dicyclopentadiene is preferentially esterified with available terminal acid groups of the partial polymer. Thereafter, the remainder of the glycol charge may be added to the reactor whereupon the reaction is continued at temperatures of about 390°F. to complete the formation of a DCP-terminated polyester polymer.

The glycols that may be used in synthesizing the DCP-terminated polyester polymer of this invention are conventional polyols and may include, for example: ethylene glycol, propylene glycol, diethylene glycol, dipropylene glycol, butanediol, hexanediol, pentaerythritol, triethylene glycol, trimethylol propane, glycerol, or mixtures thereof. Preferably, the glycols used in this invention are propylene glycol and/or dipropylene glycol as the major glycol component.

The unsaturated dibasic acid components in the DCP-polyester are $\alpha,\beta$-unsaturated dibasic acids or anhydrides and include, for example, maleic, fumaric, mesaconic, itaconic, citraconic, and the like or mixtures thereof. The anhydrides are preferred in the preparation of the DCP-esterified prepolymer. Similarly, unsaturated dibasic acid may be reacted at 308°F. with the dicyclopentadiene and thereafter esterified with the full glycol requirement to produce a DCP-terminated polyester polymer. Although not preferred, lesser amounts of saturated dibasic acids or anhydrides may be introduced into the DCP-polyester polymer to replace a portion of the unsaturated dicarboxylic acids. Conventional saturated dibasic acids include, for example, orthophthalic anhydride or acid, terephthalic acid, isophthalic acid, adipic acid, sebacic acid, succinic acid, and the like acids or anhydrides. Similarly, minor amounts of multifunctional acid such as trimellitic anhydride may be incorporated into the DCP-polyester backbone. The term dibasic acid is intended to include dibasic acid anhydrides.

Ethylenically unsaturated monomers copolymerizable with unsaturated polyester polymers are utilized to disperse or dissolve the DCP-terminated polyester polymer of this invention and form a DCP-polyester resin mixture. Such ethylenically unsaturated monomers are well known and include: styrene, methyl styrene, chlorostyrene, vinyl toluene, divinyl benzene, vinyl acetate, acrylic and methacrylic acid, lower alkyl esters of acrylic and methacrylic acid, diallyl phthalate and like unsaturated monomers or mixtures thereof. For reasons of efficiency and economy, the ethylenically unsaturated monomer most preferred in forming the low profile molding resin of this invention is styrene. It should be noted that the DCP-terminated polyester polymer of this invention accommodates substantially increased amounts of unsaturated monomers in comparison to conventional low profile polyester polymers and surprisingly improves the molded product and the molding process when increased amounts of monomer are used.

The DCP-terminated polyester resin is further modified by mixing the same with a thermoplastic polymer having acid groups thereon. The acid functional thermoplastic polymer interacts with chemical thickeners, hereinafter described, to promote thickening of the overall molding composition. The acid functionality of the thermoplastic polymer further maintains phase equilibrium of the molding system whereby the liquid/liquid dispersion is maintained during compounding, thickening and curing. The thermoplastic polymer can be provided with acid groups by polymerizing unsaturated aliphatic carboxylic acids having sufficient double-bond reactivity to react with other ethylenically unsaturated monomers used in synthesizing the thermoplastic polymer. Preferred unsaturated carboxylic acids are aliphatic, monocarboxylic or dicarboxylic acids having from 3–12 carbon atoms and include, for example, monocarboxylic unsaturated acids such as acrylic and methacrylic acids and dicarboxylic unsaturated acids such as itaconic, maleic, and fumaric acid. Preferably, the acid groups provided in the acid functional thermoplastic polymer are carboxylic acid groups, although other acid functional groups can be provided. The monomeric unsaturated acids are copolymerized with one or more ethylenically unsaturated monomers copolymerizable with the unsaturated acids. Examples of ethylenically unsaturated monomers include butadiene, styrene, vinyl acetate, vinyl toluene, vinyl chloride, acrylamide, acrylonitrile, and lower alkyl esters of acrylic and methacrylic acid having alkyl portions of 1–6 carbon atoms such as, for example, methyl methacrylate, ethyl acrylate and polyester acrylate.

The amount of acid groups provided on the acid functional polymer may be measured by acid number in a manner similar to measuring the acid number of polyester polymers. The acid functional thermoplastic polymer may be titrated with KOH to neutralize all or virtually all acidity to obtain an acid number value of the polymer by the standard acid number test well known in the polyester art. The acid number of the thermoplastic polymers may range from about 0.40 to 40 and preferably ranges from 4–20. The most preferred acid functional thermoplastic polymer should have an acid number of from about 4–12.

The preferred acid functional thermoplastic polymer suitable for combining with the DCP-polyester resin to produce a molding resin composition being a stabilized emulsion, comprises by weight from about 5–50% of a lower alkyl ester of acrylic or methacrylic acid (the alkyl portion having from 1–6 carbon atoms), from 0.05–5% acrylic or 0.06 to 6% methacrylic acid, and the balance being vinyl acetate. More than 50% lower alkyl ester often produces an unstable molding resin composition wherein a separation occurs in the liquid system producing two separate liquid layers separated by a visible meniscus. Levels of vinyl acetate greater than about 80% decrease the softening point of the thermoplastic polymer. Preferably, the thermoplastic polymer is exclusively a thermoplastic polymer having carboxylic acid groups hereinbefore described. Although minor amounts of said acid functional thermoplastic polymer may be replaced in the molding resin composition with a modifying thermoplastic polymer having no acid groups. The preferred acid functional thermoplastic polymer desirably has a viscosity range of about 1,000 to 20,000 centipoises, most preferably 3,000 to 5,000 centipoises when measured at 35% solids (NVM) in styrene at 77°F.

The foregoing stabilized resin emulsion desirably comprises a mixture of at least about 25 weight percent of the dicyclopentadiene terminated polyester polymer, about 5–20 weight % of acid functional thermoplastic polymer, and about 40–58 weight % of styrene or other ethylenically unsaturated monomer. The preferred resin mixture contains at least about 35 weight % of said polyester, about 42–52 weight % monomer, and about 10–15 weight % of an acid functional polymer having an acid number of less than about 12. The ratios of the polyester, monomer and thermoplastic may be varied within the scope of this invention to provide a uniform and stabilized emulsion system as hereinbefore described.

The low shrink molding resin composition of this invention is suitable for mixing with additives known as chemical thickeners which are physically mixed into the molding resin emulsion DCP-polyester polymers, ethylenically unsaturated monomer, and thermoplastic polymer. The chemical thickeners generally include Group II metal oxides, hydroxides and alkoxides. The oxides and hydroxides of alkaline earths are preferred. For reasons of efficiency and economy, calcium oxide and magnesium oxide, or the respective hydroxides, are most often employed with low shrink molding compositions.

Catalysts and promoters often are incorporated in small amounts into thermosetting polyester resins containing ethylenically unsaturated monomer for curing or cross-linking the unsaturated polyester with the monomer. Such catalysts and promoters are well known and may be similarly utilized in this invention for curing the DCP-polyester polymer and monomer mixed with the thermoplastic polymer. Typical catalysts, for example, include organic peroxides and peracids such as tertiary butyl perbenzoate, tertiary butyl peroctoate, benzoyl peroxide and the like. Examples of conventional promoters include cobalt octoate, cobalt naphthenate, and amines such as diethylaniline. The amounts of catalysts and promoters may be varied with the molding process and similarly varied with the level and types of inhibitors utilized, in a manner well known in the art.

Fibers, fillers and pigments normally added to polyester molding resin compositions can be likewise used in formulating the molding composition of this invention. Examples include: glass fibers, chopped fibers, chalk, kaolin, asbestos, kieselguhr, calcium carbonate, talc, ceramic spheres, and quartz. Examples of pigments include cadmium yellow, carbon black, iron oxide, titanium dioxide, etc., as well as organic pigments such as the phthaloorganamine blues and greens.

The following examples are provided to illustrate the preferred embodiments of this invention and are not intended to restrict the scope thereof. All parts are parts by weight, all percentages are expressed as weight percentages, and all temperatures are in degrees Fahrenheit, unless otherwise expressly specified.

EXAMPLE I

A DCP-modified polyester polymer was synthesized from the following raw materials:

9.9 gram moles of propylene glycol (752 grams)
2.0 gram moles of dicyclopentadiene (264 grams)
10.0 gram moles of maleic anhydride (980 grams).

Polymer synthesis was carried out in an ordinary reaction vessel suitable for batch processing of polyesters and including an agitator, heating means, condenser, and inert gas flow.

FIRST STEP:

Formation of an acid terminated partial copolymer of propylene glycol-maleic ester was made by charging 5.0 gram moles of propylene glycol and 10.0 moles of maleic anhydride together with 3% xylene (based on the charge) into the reaction vessel and by heating under inert gas to 300°F. and holding at 300°F. for about 30 minutes until the acid number of the batch became constant. The acid number became constant at about 412 whereupon the second step commenced.

SECOND STEP:

A prepolymer was prepared by adding the 2.0 moles of the dicyclopentadiene to the propylene-maleic partial copolymer at a reaction temperature of 308°F. The 2.0 moles of DCP were mixed with 3% xylene and added to the reaction vessel at a steady and continuous rate for a time period of 30 minutes and the reaction then continued until the acid number of the batch leveled off at about 276.

THIRD STEP:

A DCP-terminated polyester was prepared by charging the remaining 4.9 moles of propylene glycol to the foregoing prepolymer in the reaction vessel, together with 0.3 grams of hydroquinone. The batch temperature was gradually increased to about 390°F. and further processed until an acid number of 30 was reached. A test sample of 7 parts resin mixed with 3 parts styrene yielded a viscosity of 3,600 cps. at 77°F. Xylene and water of reaction were stripped from the batch.

FOURTH STEP:

The DCP-polyester polymer was then cooled to 200°F., 0.5 grams of hydroquinone was added to the polymer which was then diluted with styrene to yield a DCP-polyester resin containing a ratio of 70 weight parts of DCP-polyester polymer and 30 weight parts of styrene monomer. Thereafter, about 1 gram Ionol was added and the resin was discharged to a holding tank.

EXAMPLE II

A thermoplastic suspension polymer was synthesized from the following monomers:
 71.4 parts of vinyl acetate monomer
 27.4 parts of methyl methacrylate monomer
 1.2 parts of acrylic acid.
About 200 parts of demineralized water was heated to 153°F., and 3% of the above monomer mixture containing about 2 weight parts of methyl ethyl ketone (MEK) and 1 weight part of benzyl peroxide (BPO) were added to the water. The temperature of the aqueous mixture was maintained at 153°F. with a nitrogen gas sparge. The remaining monomers were added to the aqueous mixture over a period of time and at a steady rate to maintain the batch temperature at about 153°F. After the monomers were added, the batch temperature was raised to 176°F. and held for 1 hour. The resulting suspended thermoplastic polymer was cooled. Thereafter, the suspended thermoplastic polymer was dried by centrifuging to remove a major portion of the water. The partially dried thermoplastic polymer was then dispersed in styrene at about 120°F. and thereafter vacuum stripped of remaining water. The thermoplastic was then reduced with styrene in the ratio of 35 parts polymer to 65 parts styrene. About 0.01% of benzoquinone was added per 100 weight parts of mixture.

EXAMPLE III

The resin composition of Example I was mixed at room temperature with the resin composition of Example II by charging to a mixing vessel the following:
 60 weight parts of Example I
 40 weight parts of Example II
 9 weight parts of styrene.
The mixture was mildly agitated to form a uniform stabilized resin emulsion system. The resulting resin had a viscosity of 1,250 centipoises, a weight per gallon of 8.76, and SPI gel time of 12 minutes, an SPI reaction time of 13.7 minutes, and an SPI peak exothermic of 425°F. with 1% BPO at 180°F.

EXAMPLE IV

A bulk molding compound was prepared by mixing together in a Baker-Perkins dough mixer the following materials (parts by weight):

| | |
|---|---|
| $CaCO_3$ | 53.0 |
| Zinc stearate | 1.5 |
| Molding resin composition of Example III | 27.0 |
| t-Butyl perbenzoate | 0.5 |
| ¼" Glass strand | 20.0 |
| $Mg(OH)_2$ | 0.5 |

The calcium carbonate and zinc stearate were first dry blended in the mixer. Then the t-butyl perbenzoate catalyst was stirred into the liquid molding resin composition and that mixture slowly added to the material in the dough mixer while mixing continued. After thorough wetting of the calcium carbonate had been achieved, the chopped glass fiber reinforcement was added and mixing was continued for about 2 minutes until the glass had been thoroughly wetted. The magnesium hydroxide thickener was then added and mixing continued for about two more minutes. The mixing period after addition of the glass was kept as short as possible, consistent with achieving wetting of the glass and uniform dispersion of the glass and thickener, so as not to cause excessive breaking of the glass into shorter strands which would contribute less reinforcement to the molded articles to be produced from the bulk molding compound. The bulk molding compound was finally discharged from the mixer and held overnight (before molding) to insure that the thickening process was substantially complete.

EXAMPLE V

A piece was molded in the following shape: about nine inches square and ⅛ inch thick having on one of its surfaces: (1) a straight rib about ½ inch deep tapering from about 7-5/16 inches long and 9/16 inches wide at the base to about 7-3/16 inches long and ⅜ inches wide at its flat outer extremity, having rounded ends and with its longitudinal centerline about one inch from the edge of the nine-inch square; (2) an L-shaped rib about ½ inch deep with branches about 7½ inches long and 1¾ inches long having centerlines about one inch from the edges of the 9 inch square, the long branch being parallel to the straight rib (1) above and near the opposite edge of the square, the width tapering from about 5/16 inch at the base to about ¼ inch at its flat outer extremity and having rounded ends tapered at about the same angle as the straight rib (1) above; and three circular bosses centered at about 2 inch intervals along a line about 2½ inches from the edge of the square adjacent to the long branch of the L-shaped rib (2) above and being, respectively, (a) about ½ inch deep and tapering from about 1 inch in diameter at the base to about 15/16 inch at its flat extremith, (b) about ¼ inch deep and tapering from about 1 inch in diameter at the base to about 31/32 inch at its flat extremity, and (c) about ¼ inch deep and tapering from about ⅝ inch diameter at the base to about 9/16 inch at its flat extremity, wherein all tapers were approximately flat except for 3 (c) in which the taper was more pronounced near the base and less pronounced near the extremity.

About 350 grams of the bulk molding compound from Example IV was placed as a compact mass in the steel die which had been preheated to 295°F. on the cavity side and 285°F. on the plunger side, the die was quickly closed in a press, and held closed for 2 minutes. The press was then opened and the molded piece removed from the die.

EXAMPLE VI

Sheet molding compound was prepared by first mixing together, by successive additions in the order stated, the following materials (parts by weight):

| Molding resin composition of Example III | 100.0 |
|---|---|
| t-Butyl perbenzoate | 2.0 |
| Zinc stearate | 3.7 |
| $CaCO_3$ | 180.0 |
| $Mg(OH)_2$ | 5.0 |
| 1 inch hard glass strand | 96.9 |

The molding resin composition was introduced to a Cowles high speed mixer at about 1,000 rpm. The speed was gradually increased with successive additions so as to maintain a vortex but without excessive air entrainment, and the magnesium hydroxide thickener was not added until the previously added dry materials were thoroughly wetted and uniformly dispersed at which point the temperature was about 100°F. After addition of the magnesium hydroxide, stirring was continued for about 2 minutes. This mixture was then discharged and promptly (before excessive thickening, i.e. viscosity increase, had occurred) introduced into a Brenner SMC machine wherein it was spread onto two sheets of polyethylene film to a thickness of about 1/16 inch on each sheet, the 1 inch glass strands distributed over the exposed surface of one of these sheets and the exposed surfaces of the two sheets then brought together by passing between a pair of rollers. Thorough wetting of the glass was accomplished by then passing the laminated sheet between successive sets of ridged rollers to provide a kneading action. The sheet molding compound so produced was about ⅛ inch thick and was held about 5 days before molding so as to insure substantial completion of the thickening process.

EXAMPLE VII

A piece was molded in the molding die described in Example V from the sheet molding compound of Example VI by folding a sheet of that material weighing about 375 grams into the die cavity which had been preheated to 300°F. on the cavity side and 290°F. on the plunger side. The die was quickly closed in a press, held closed for about 2 minutes with an applied pressure of about 1,000 lb./sq. in. (i.e. about 81,000 lbs. total force) and then released, the die opened, and the price removed.

EXAMPLE VIII a. A molded part of Example VII was measured for "sink marks" at the three circular bosses which were particularly selected for exaggerated waviness. The compound of Example VII produced an average deviation from the base line of 109 micro-inches which was measured by a Bendix Microcorder.

b. The molded part of Example V produced a deviation of 110 microinches.

c. A prior art resin (Paraplex P-19C) was similarly compounded in the manner described in Examples VI and VII and measured. The average deviation was 140 micro-inches.

d. A standard polyester of 1.1 moles of propylene glycol, 0.5 moles of maleic anhydride, 0.5 moles of phthalic anhydride was cooked to acid number of 30 and reduced to 65% N.V.M. in styrene. The resin was compounded similarly to composition of Example VI and molded in the mold of Example V which produced a drastically deformed product. The same resin composition was molded in an ordinary 0.10 inch thickness flat sheet which produced deviations in excess of 1,000 micro-inches.

e. Ordinary 24 gage sheet steel was measured and found to have an average deviation of 275 micro-inches.

f. A sheet molding composition compounded as indicated in Example VI was molded into a flat sheet having a thickness of 0.10 inches which produced negligible deviations.

While the invention has been illustrated by the foregoing examples, it is understood that various modifications are contemplated and may be made within the scope of this invention, as defined in the following claims.

We claim:

1. A low-profile molding resin composition for thickening with Group II metal oxides, hydroxides, or alkoxides, comprising:

a stable resin emulsion comprising by weight a mixture of at least 25% of a dicyclopentadiene terminated ethylenically unsaturated polyester polymer, about 5 to 20% of an acid functional thermoplastic polymer, and about 40 to 58% of an ethylenically unsaturated monomer;

said dicyclopentadiene polyester being the esterification product of an alpha,beta-ethylenically unsaturated dicarboxylic acid, dicyclopentadiene, and glycol, said dicarboxylic acid esterified with about 0.1 to 0.4 moles of dicyclopentadiene per mole of dicarboxylic acid; said polyester produced by first reacting a molar excess of said polycarboxylic acid with said glycol to produce an acid terminated prepolymer, and then reacting the dicyclopentadiene with said prepolymer and said thermoplastic polymer being a copolymer of ethylenically unsaturated monomers comprising by weight from about 5–50% of (a) a lower alkyl ester of an unsaturated acid selected from the group of acrylic acid or methacrylic acid, and (b) an unsaturated acid selected from the group consisting of acrylic acid or methacrylic acid, and substantially the balance being (c) vinyl acetate, said thermoplastic polymer having an acid number of at least about 0.4.

2. The composition in claim 1 wherein said mixture contains between about 10 to 15% thermoplastic having an acid number between about 4 and 20.

3. The composition in claim 2 wherein the acid number of said thermoplastic is between about 4 and 12.

4. A low-profile molding resin composition for thickening with Group II metal oxides, hydroxides, or alkoxides, comprising:
   a stable resin emulsion comprising by weight a mixture of at least about 25% of a dicyclopentadiene terminated ethylenically unsaturated polyester polymer, about 5 to 20% of an acid functional thermoplastic polymer, and 40 to 58% ethylenically unsaturated monomer;
   said dicyclopentadiene terminated polyester being the esterification product of an alpha,beta-ethylenically unsaturated dicarboxylic acid, dicyclopentadiene, and glycol, said dicarboxylic acid being esterified with about 0.1–0.4 moles of dicyclopentadiene per mole of said dicarboxylic acid, said polyester produced by first reacting a molar excess of said dicarboxylic acid with said glycol to produce an acid terminated prepolymer, and then reacting the dicyclopentadiene with said prepolymer at temperatures between about 290°F and 310°F;
   said acid functional thermoplastic polymer having an acid number of at least about 0.4 and being the copolymer of major amounts of ethylenically unsaturated monomers of vinyl acetate and a lower alkyl ester of acrylic or methacrylic acid copolymerized with minor amounts of unsaturated acids selected from acrylic, methacrylic, itaconic, maleic, and fumaric.

5. A method of producing a low-profile molding composition for thickening with Group II metal oxides, hydroxides, and alkoxides, comprising:
   providing a dicyclopentadiene terminated ethylenically unsaturated polyester polymer being substantially the esterification product of a glycol, dicyclopentadiene, and an alpha,beta-ethylenically unsaturated dicarboxylic acid, said dicarboxylic acid being esterified with 0.1 to 0.4 moles of dicyclopentadiene per mole of said unsaturated dicarboxylic acid wherein an excess molar equivalent of said dicarboxylic acid is first reacted with glycol to produce an acid terminated prepolymer which is thereafter reacted with said dicyclopentadiene at temperatures between 290° to 310°F;
   mixing said dicyclopentadiene polyester with an acid-functional thermoplastic polymer having an acid number of at least about 0.4 and being the copolymer of major amounts of ethylenically unsaturated monomer of vinyl acetate and a lower alkyl ester of acrylic ester of acrylic or methacrylic acid and minor amounts of unsaturated carboxylic acid selected from acrylic, methacrylic, itaconic, maleic, and fumaric, together with ethylenically unsaturated monomer to produce a stable emulsion mixture comprising by weight at least about 25% of said polyester, about 5 to 25% of said thermoplastic polymer, and about 40 to 58% of said ethylenically unsaturated monomer.

6. The process of claim 5 wherein the dicyclopentadiene terminated polyester polymer is produced by first esterifying an excess molar equivalent of said alpha,beta-ethylenically unsaturated dicarboxylic acid with a portion of the glycol requirements to produce an acid-terminated partial polymer, esterifying unreacted dicarboxylic acid groups of said partial polymer with dicyclopentadiene at said temperature between about 290°F–310°F until substantially all the dicyclopentadiene is esterified with said dicarboxylic acid groups, and thereafter esterifying unreacted dicarboxylic acid groups with the remainder of said glycol requirements.

7. The process of claim 6 wherein about one-half of the glycol is first reacted with the excess dicarboxylic acid, and the remaining one-half of the glycol is reacted with after the intermediate step of esterifying dicyclopentadiene with the unreacted dicarboxylic acid groups attached to the acid terminated prepolymer at temperatures between about 290°F–310°F.

\* \* \* \* \*